US007614139B2

(12) United States Patent
Itrich

(10) Patent No.: US 7,614,139 B2
(45) Date of Patent: Nov. 10, 2009

(54) HYDRAULIC WEDGE CONNECTION TOOL

(75) Inventor: Todd J. Itrich, West Chicago, IL (US)

(73) Assignee: Huskie Tools, Glendale Heights, IL (US)

( * ) Notice: Subject to any disclaimer, the term of this patent is extended or adjusted under 35 U.S.C. 154(b) by 498 days.

(21) Appl. No.: 11/157,508

(22) Filed: Jun. 21, 2005

(65) Prior Publication Data

US 2005/0233650 A1 Oct. 20, 2005

Related U.S. Application Data

(60) Continuation of application No. 10/952,347, filed on Sep. 28, 2004, now Pat. No. 7,165,319, which is a division of application No. 10/386,188, filed on Mar. 11, 2003, now Pat. No. 6,895,663.

(51) Int. Cl.
*B23F 19/00* (2006.01)
*H01R 43/042* (2006.01)

(52) U.S. Cl. ............................ 29/751; 29/752; 29/753; 29/754; 29/761; 72/456

(58) Field of Classification Search ........... 29/750–758, 29/254–255; 60/632, 635; 140/113; 227/10, 227/202; 7/107; 72/456, 416, 470, 407; 384/41; 81/129, 129.5
See application file for complete search history.

(56) References Cited

U.S. PATENT DOCUMENTS 2,821,877 A * 2/1958 Swanson ..................... 72/445
3,212,534 A 10/1965 Broske
4,722,189 A 2/1988 Center
5,337,566 A * 8/1994 Lomastro et al. .............. 60/632
5,377,415 A 1/1995 Gibson
5,533,254 A 7/1996 Gallo et al.
5,785,229 A 7/1998 Franzini
6,446,482 B1 * 9/2002 Heskey et al. ............ 72/453.16
6,516,523 B1 2/2003 Lin
6,564,610 B2 * 5/2003 Lefavour et al. ......... 72/453.16
6,666,064 B2 * 12/2003 LeFavour et al. ......... 72/453.15
6,769,173 B2 * 8/2004 Chadbourne ................. 29/761
6,792,789 B1 * 9/2004 Faucher ....................... 72/456
6,895,663 B2 * 5/2005 Itrich .......................... 29/750
6,986,274 B2 * 1/2006 Lefavour et al. ......... 72/453.16
7,165,319 B2 * 1/2007 Itrich .......................... 29/750

OTHER PUBLICATIONS

Burndy WEJTAP Publication—FCI Burndy Products (5 pages).

* cited by examiner

*Primary Examiner*—Minh Trinh
(74) *Attorney, Agent, or Firm*—Wood, Phillips, Katz, Clark & Mortimer

(57) ABSTRACT

A wedge connection tool for securing a tap connector having a C shaped member and a wedge using a ram tool. The tool head comprises an elongate base member comprising first and second ends. A collar at the first end of the base member has a through opening for receiving a ram tool. A head at the second end of the base member is aligned with the collar through opening to engage a C shaped member. A cable stop plate is mounted to the head for limiting movement of a tap line cable received in a C shaped member when a ram tool is securing a tap connector.

8 Claims, 8 Drawing Sheets

HYDRAULIC WEDGE CONNECTION TOOL

CROSS-REFERENCE

This is a continuation of U.S. Ser. No. 10/952,347 filed Sep. 28, 2004, now U.S. Pat. No. 7,165,319, which is a division of U.S. Ser. No. 10/386,188 filed Mar. 11, 2003, now U.S. Pat. No. 6,165,663.

FIELD OF THE INVENTION

This invention relates to a tool for securing a tap connector to electrical cables and, more particularly, a tool head for use with a ram tool.

BACKGROUND OF THE INVENTION

In electrical power systems it is occasionally necessary to tap into an electrical power line. One known system for tapping into an electrical power line is to use a tap connector for electrically connecting a mainline electrical cable to an end of a tap line electrical cable. One such tap connector, referred to as a wedge connector, comprises a conductive C shaped member and a wedge. The two cables are positioned at opposite sides of the C shaped member and the wedge is driven between the two cables. This forces the two cables against the C shaped member.

Wedge connectors are conventionally installed using an explosively driven connecting tool. The C shaped member is held in place on a tool head connected to a cartridge chamber. The cartridge chamber accepts a gun powder shell casing with a specific powder charge that is activated by striking the casing with a hammer. The explosion drives a ram that forces the wedge portion of the connector between the two cables of similar or different sizes. The high velocity of the wedge prevents the cables from "birdcaging". The cables tend to birdcage if the speed of the ram is slowed down. This can result in the connection not being properly made.

The present invention is intended to solve one or more of the problems discussed above.

SUMMARY OF THE INVENTION

In accordance with the invention there is provided a tool for securing a tap connector, the tool including a cable stop for limiting movement of a tap line cable.

Broadly, in accordance with one aspect of the invention there is disclosed a tool head for securing a tap connector having a C shaped member and a wedge using a ram tool. The tool head comprises an elongate base member comprising first and second ends. A collar at the first end of the base member has a through opening for receiving a ram tool, in use. A head at the second end of the base member is aligned with the collar through opening to engage a C shaped member, in use. A cable stop plate is mounted to the head for limiting movement of a tap line cable received in a C shaped member when a ram tool is securing a tap connector.

It is one feature of the invention that the cable stop plate is removably mounted to the head. A screw may removably mount the cable stop plate to the head.

It is another feature of the invention that the base member, the collar and the head are of one piece construction.

It is still another feature of the invention that the cable stop plate includes a counter bore receiving an end of a tap line cable.

It is still another feature of the invention that the cable stop plate is mountable to opposite sides of the head.

There is disclosed in accordance with another aspect of the invention a tool for securing a tap connector having a C shaped member and a wedge. The tool comprises a drive member including a ram. A tool head includes an elongate base member comprising first and second ends. A collar at the first end of the base member is mounted to the drive member. A head at the second end of the base member is aligned with the ram to engage a tap connector, in use. A cable stop plate is mounted to the head for limiting movement of a tap line cable received in a tap connector when the ram is securing a tap connector.

It is a feature of the invention that the drive member comprises a portable tool such as a battery operated tool.

Further features and advantages of the invention will be readily apparent from the specification and from the drawings.

BRIEF DESCRIPTION OF THE DRAWINGS

FIGS. 8-11 illustrate various perspective views showing the operation of the tool head of FIG. 4 for securing a tap connector;

DETAILED DESCRIPTION OF THE INVENTION

Figure 1:
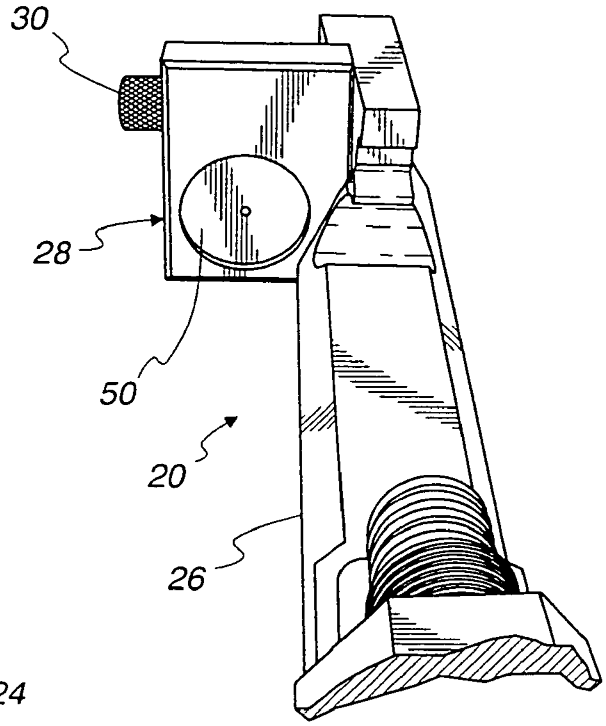
FIG. 1 is a partial perspective view of a tool for securing a tap connector in accordance with the invention with a ram in a retracted position.
Figure 2:
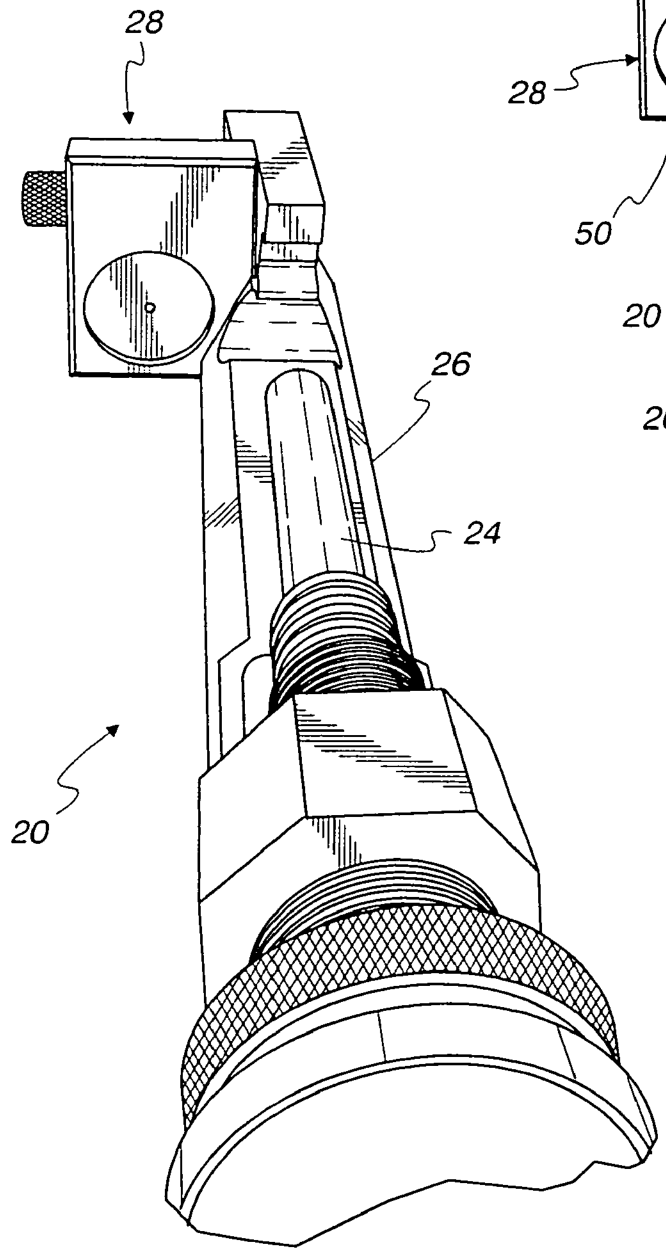
FIG. 2 is a view similar to that of FIG. 1 illustrating the ram in an extended position.

Referring to FIGS. 1 and 2, a tool 20 in accordance with the invention is provided for securing a tap connector to electrically connect a mainline electrical cable to an end of a tap line electrical cable, as described more specifically below.

The tool 20 includes a drive member 22, including a ram 24, and a tool head 26. The tool head 26 is similar to existing tool heads such as used by various manufacturers for securing tap connectors using an explosion type drive member, as described above. In accordance with the invention, the tool head 26 is adapted to include a cable stop plate 28 secured to the tool head 26 using a thumb bolt 30. The purpose of the cable stop plate 28 is to prevent cable strands from sliding as the wedge is installed into the connector to connect two cables of the same or different sizes together. The wedge is pushed in position by advancement of the ram 24. In accordance with the invention, the drive member 22 comprises a battery operated tool that advances the ram 24 at a relatively low speed, as described more specifically below.

Figure 3:
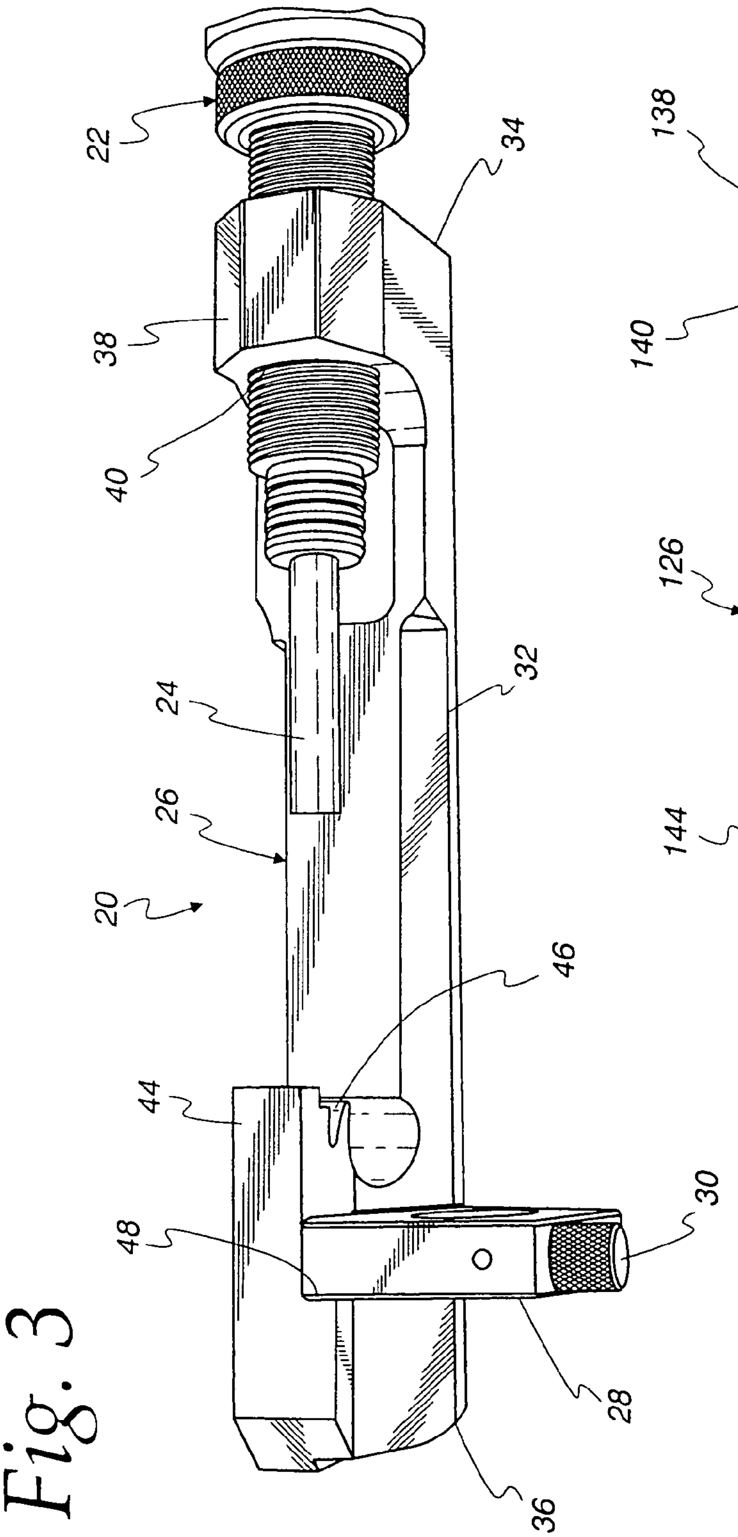
FIG. 3 is a side plan view of the tool of FIG. 2.

Referring also to FIG. 3, the tool head 26 is of one piece metal construction. The tool head 26 comprises an elongate base member 32 having a first end 34 and an opposite second end 36. A collar 38 extends upwardly from the base member

32 at the first end 34. The collar 38 includes a central threaded bore 40. The bore 40 has an axis (not shown) which runs parallel to the base member 32. A head 44 extends upwardly from the base member 32 at the second end 36. The head 44 is notched as at 46 for receiving a C shaped member of a tap connector. One side of the head 44 includes a shoulder 48 for engaging the cable stop plate 28. The thumb bolt 30 is threaded into a threaded opening (not shown) in the head 44 to a side of the shoulder 48 closer to the first end 34, as is apparent. The cable stop plate 30 includes a counter bore 50 facing toward the first end 34. The head 44 is aligned with the collar through opening 40. As is apparent, a shoulder 48 and threaded opening may be provided on both sides of the head 44 so the cable stop plate 28 can be mounted on either side of the head 44.

Figure 4:
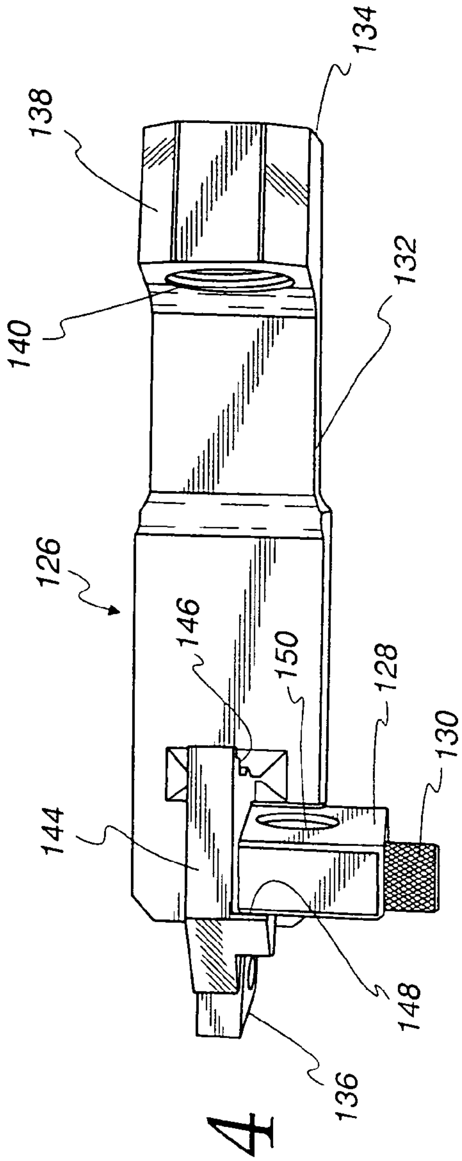
FIG. 4 is a plan perspective view of a tool head in accordance with the invention for use for securing a smaller size tap connector.
Figure 5:
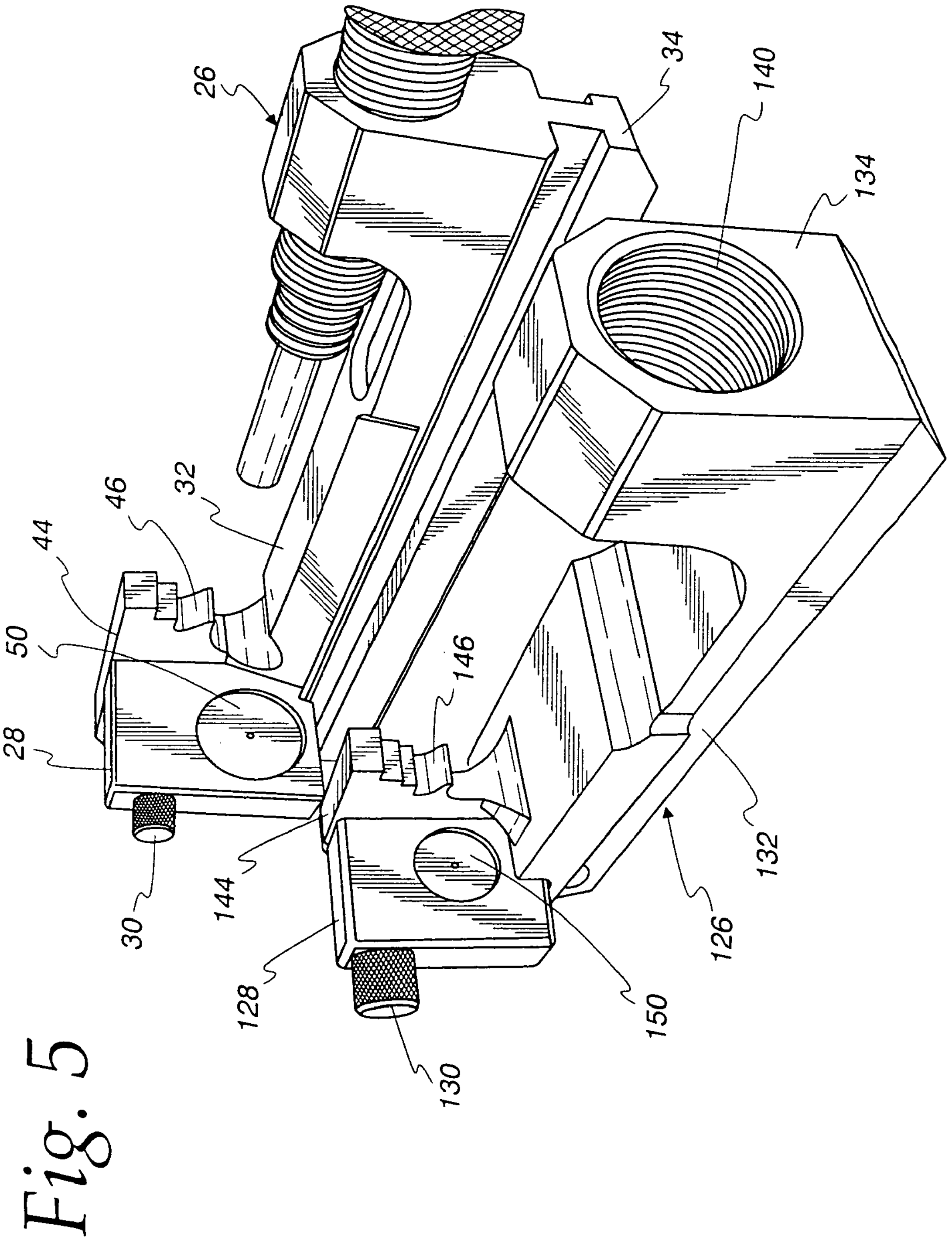
FIG. 5 is a perspective view illustrating the tool head of FIG. 4 adjacent the tool head of FIG. 3.
Figure 6:
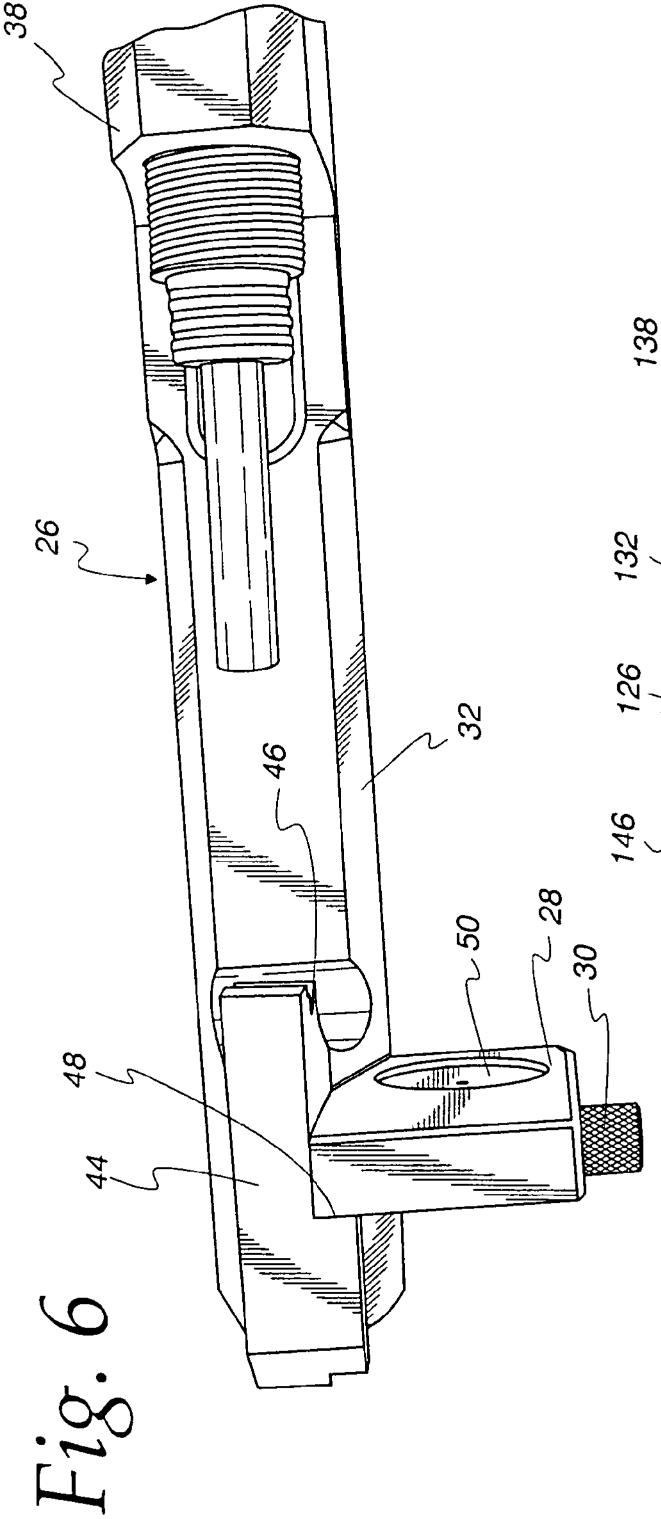
FIG. 6 is a plan perspective view of the tool of FIG. 3.
Figure 7:
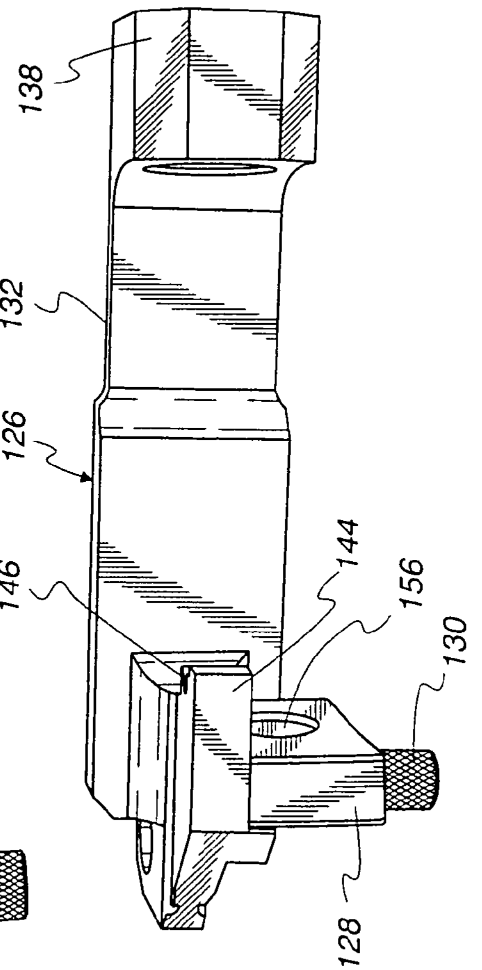
FIG. 7 is a perspective view of the tool head of FIG. 4.
Figure 8:
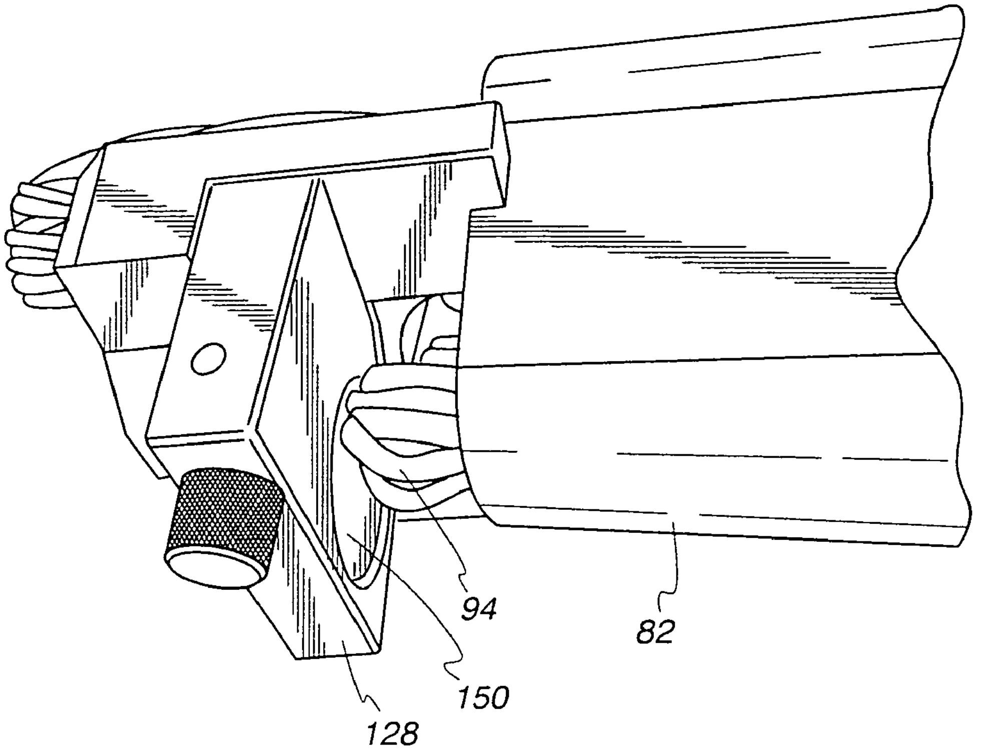
FIG. 8 is a partial perspective view illustrating a tap connector and cables mounted to the tool head of FIG. 4.

Known tap connectors come in different sizes according to the size of cable to be connected. The tool head 26 shown in FIGS. 1-3 is adapted for securing a relatively large size tap connector. FIG. 4 illustrates a tool head 126 in accordance with the invention adapted for securing a smaller size tap connector. For simplicity, the elements of the tool head 126 of FIG. 4 are illustrated adding the numeral 1 as the most significant digit to the reference numerals used with respect to FIGS. 1-3. For example, the base member of the tool head 26 is referenced with the numeral 32. Similarly, the base member of the tool head 126 is referenced using the numeral 132. The principal difference between the tool head 26 of FIG. 3 and the tool head 126 of FIG. 4 is that the length of the base member 132 is shorter than the length of the base member 32. Likewise, the size of the head 144 is smaller than the size of the head 44 to accommodate the smaller sized tap connector. The size relationship is evident in FIG. 5 which illustrates the tool head 26 adjacent the tool head 126. As is apparent, other differences exist between the precise configuration of the base members and 126 unrelated to the features of the present invention.

Figure 12:
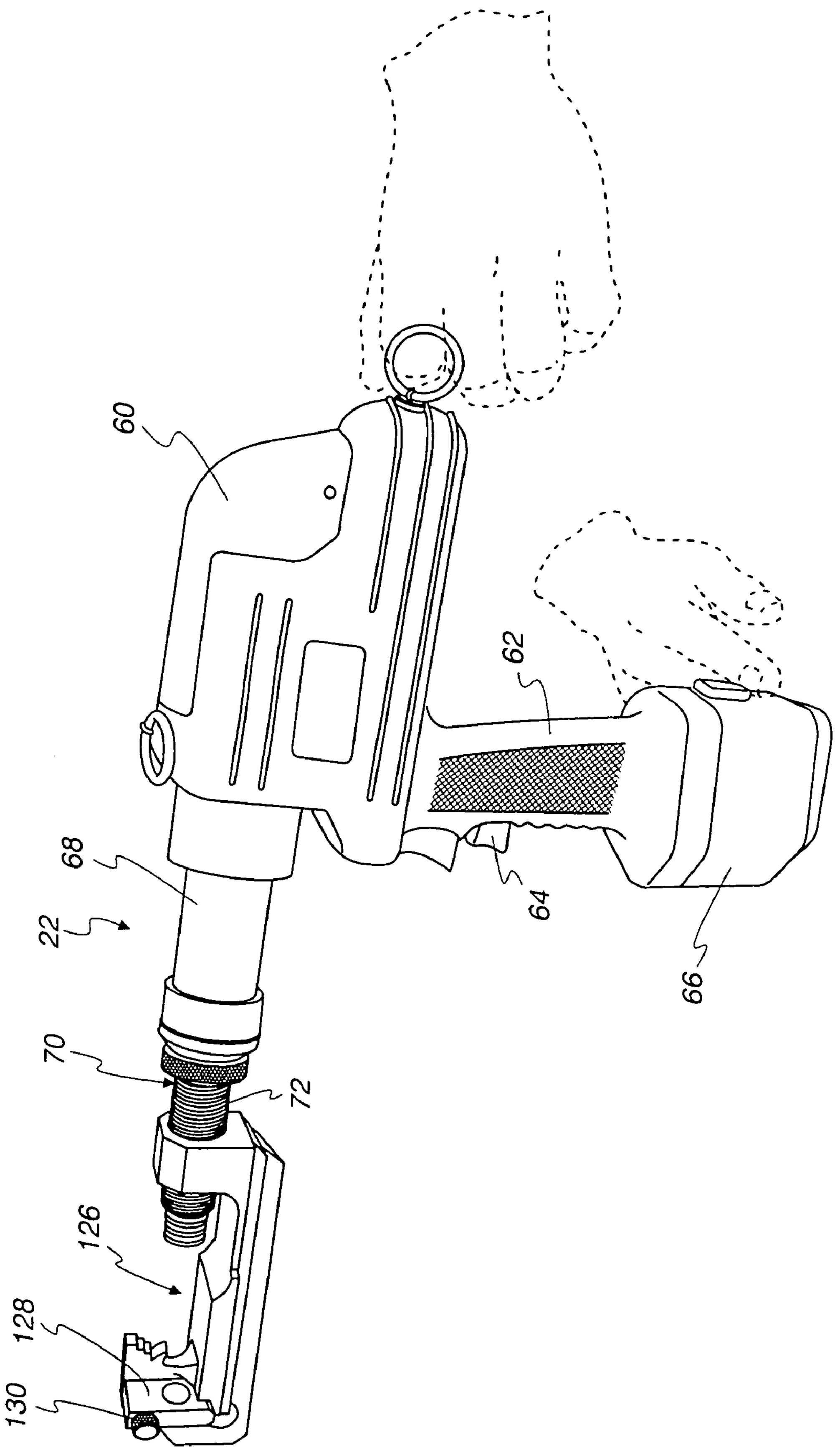
FIG. 12 is a perspective view illustrating the entire tool utilizing the tool head of FIG. 4.

Referring to FIG. 12, the drive member 22 is illustrated in greater detail mounted to the tool head 126. The drive member 22 comprises a portable battery operated tool. Particularly, the drive member 22 comprises a housing 60 mounted to a handle 62 including a trigger 64. A battery 66 is mounted at the bottom of the handle 62. A sleeve 68 extends outwardly from the housing 60 and is connected to an adapter 70. The adapter 70 includes threads 72 for being received in the threaded bores 40 and 140. The ram 24 is hydraulically driven by an hydraulic circuit in the housing 60. The hydraulic circuit is conventional in nature such as produced by the assignee of the present invention in connection with its ROBO*CRIMP line of hydraulic compression and cutting tools. The hydraulic circuit produces a force on the ram 24 in the range of 3 to 8 tons, provides a stroke of 1 to 3 inches and a ram speed of about 3 seconds unloaded and 4.5 seconds loaded. In the illustrated embodiment of the invention, the hydraulic circuit is powered by a 14.4 volt battery 66.

As is apparent, the cable stop plates 28 and 128 and associated tool heads 26 and 126 could be used in connection with various drive members. Regardless of the drive member 22, the cable stop plates 28 and 128 prevent cable strands from sliding as a wedge is installed into a connector C shaped member.

Figure 9:
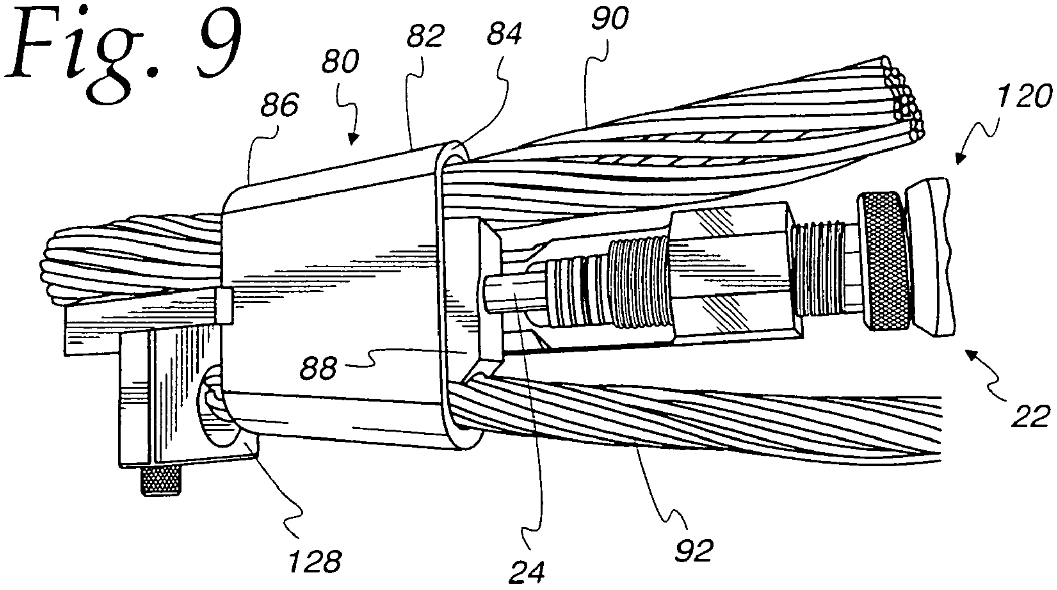

Referring to FIGS. 8-11, various views illustrate use of the tool 120. FIG. 9 particularly illustrates a conventional tap connector 80 including a C shaped member 82 which diverges from a first end 84 to a second end 86. The C shaped member may be formed of an aluminum alloy or the like. A wedge 88 is receivable in the C shaped member 82 between a pair of conductors such as a main line electrical cable 90 and a tap line electrical cable 92. The cables 90 and 92 may be of different sizes, as illustrated, or be of the same size. Likewise, one of the cables 90 or 92 may be replaced by a permanent rod or stirrup or the like to provide an alternative type connection, as will be apparent to those skilled in the art.

Figure 10:
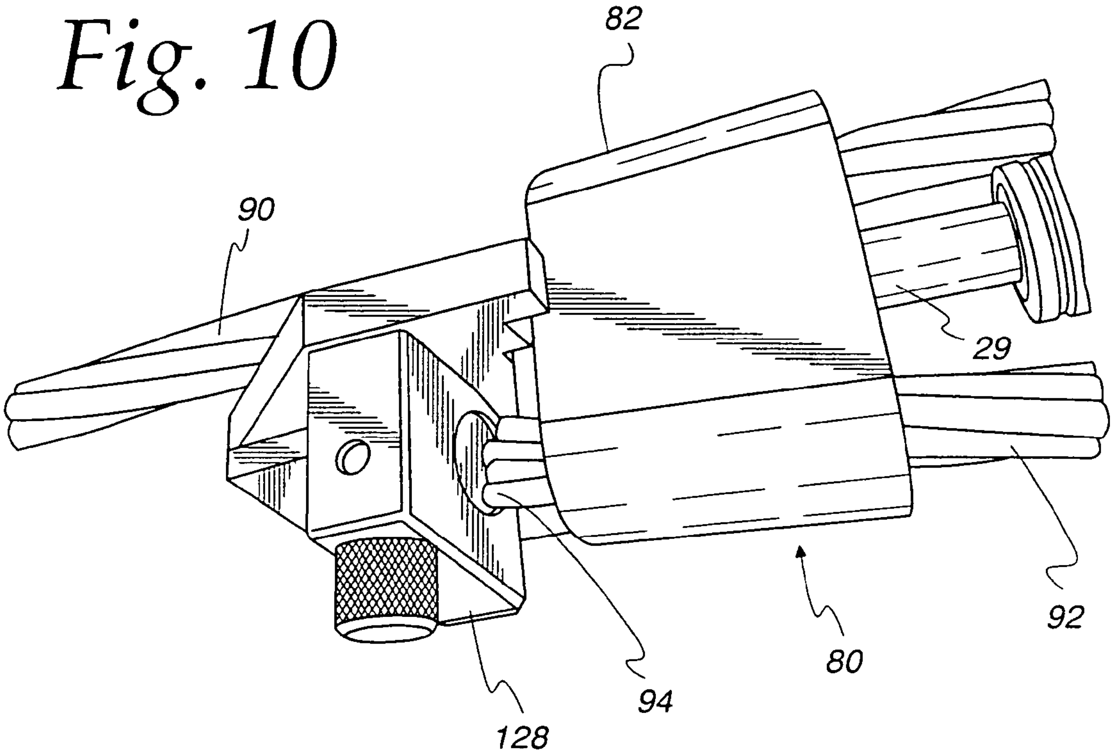
Figure 11:
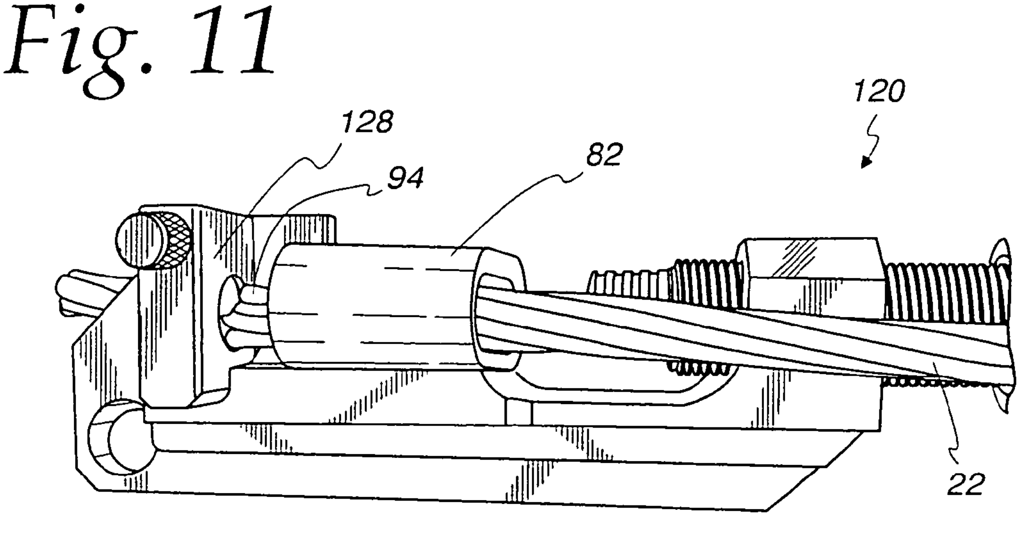

In accordance with the invention, the tap line electrical cable 92 is inserted into the C shaped member 82 so that a distal end 94 is received in the cable stop plate counter bore 150. The ram 24 is powered by the drive member 22 to slowly advance the ram 24. FIG. 9 illustrates the wedge 88 during its initial insertion into the C shaped member 82. FIGS. 10 and 11 illustrate the tap connector 80 after the wedge 88 has been fully inserted in the C shaped member 82. As is apparent, the cable stop plate 128 prevents cable strands of the tap line electrical cable end 92 from sliding as the wedge 88 is installed into the C shaped member 82. This is true notwithstanding the relatively slow movement of the ram 24 from the battery operated drive member 22.

Figure 13:
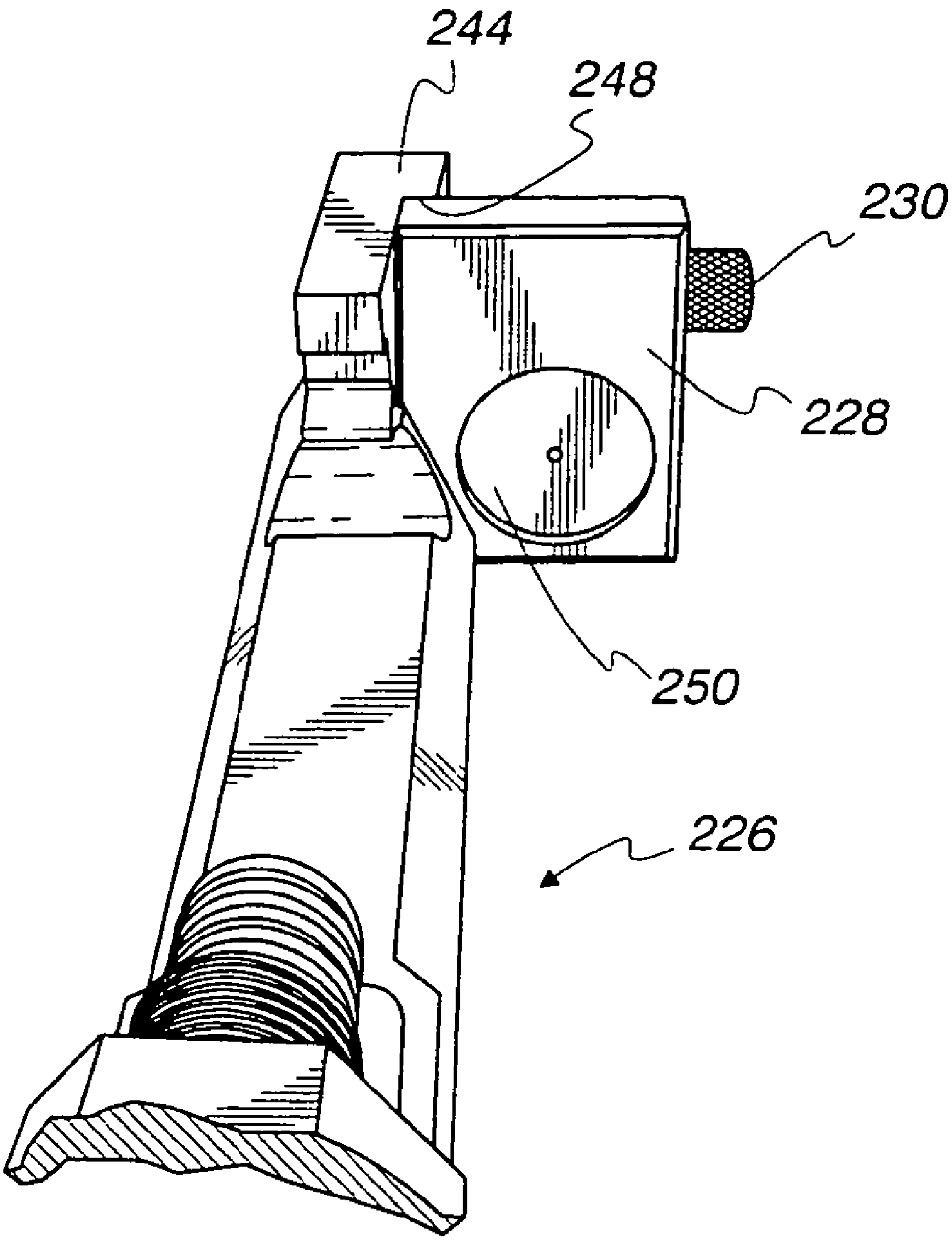
FIG. 13 is a view similar to that of FIG. 1 illustrating an embodiment with the cable stop plate mounted to an opposite of the head.

The tool head 26 of FIG. 1 illustrates the cable stop plate 28 mounted to the left side of the head 44. FIG. 13 illustrates an alternative embodiment of a tool head 226. For simplicity, reference numerals in FIG. 13 are similar to those in FIG. 1, except using the 200 series for the similar elements. Particularly, the tool head 226 includes a head 244 having a shoulder 248 on its right side for receiving a cable stop plate 228 secured with a thumb screw 230. With this design the tap line electrical cable can be mounted on the opposite side of the tap connector, as is apparent to those skilled in the art.

In accordance with the invention, the cable stop plates 28, 128 and 228, can be retrofitted to existing tool heads via the respective thumb bolt 30, 130 or 230, or alternatively a pin. Likewise, the tool head can be configured to allow the stop plate to be positioned on either side by combining the features of the tool heads illustrated herein.

I claim:

1. A tool for securing a tap connector, having a sleeve and a wedge received in the sleeve, to a mainline electrical cable and a tap line electrical cable, the tool comprising:
- an hydraulic operated drive member including a ram;
- an elongate base member;
- a collar on the base member having a through opening for receiving the drive member; and
- a notched element on the base member aligned with the collar through opening to engage the sleeve,
- the notched element supporting the sleeve when the ram is driving the wedge into the sleeve for electrically connecting the mainline electrical cable to the tap line electrical cable using the tap connector.

2. The tool of claim 1 further comprising a cable stop plate removably mounted to the base member.

3. The tool of claim 2 wherein a screw removably mounts the cable stop plate to the base member.

4. The tool of claim 1 wherein the base member, the collar and the notched element head are of one piece construction.

5. The tool of claim 2 wherein the drive member advances the ram at a relatively low speed.

6. The tool of claim 5 wherein the drive member advances the ram to provide a stroke of about 1 to 3 inches in a time range of about 3 to 4.5 seconds.

7. The tool of claim 1 wherein the drive member comprises a portable tool.

8. The tool of claim 1 wherein the drive member comprises a battery operated tool.

* * * * *

UNITED STATES PATENT AND TRADEMARK OFFICE

CERTIFICATE OF CORRECTION

PATENT NO. : 7,614,139 B2
APPLICATION NO. : 11/157508
DATED : November 10, 2009
INVENTOR(S) : Todd J. Itrich It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 363 days.

Signed and Sealed this

Nineteenth Day of October, 2010

David J. Kappos

David J. Kappos
*Director of the United States Patent and Trademark Office*